ture of an organopolysiloxane having an average degree of substitution of from 1.75 to 2.25 organic groups per silicon atom, said organic groups being directly attached to silicon by carbon-silicon linkage, a filler, a vulcanizing agent, and an organic tin compound selected from the group consisting of polymeric organotin oxides, hexaorganodistannoxanes, and tin salts of carboxylic acids.

2,842,516

ELASTOMERIC ORGANOPOLYSILOXANES CONTAINING ORGANO-TIN COMPOUNDS AND METHOD OF PREPARATION

Siegfried Nitzsche and Manfred H. Wick, Burghausen, Oberbayern, Germany, assignors to Wacker Chemie G. m. b. H., Munich, Bavaria, Germany No Drawing. Application May 12, 1954
Serial No. 429,368

Claims priority, application Germany May 23, 1953

13 Claims. (Cl. 260—37)

The present invention relates to elastomeric organopolysiloxanes and methods for their production.

As is well known in the art, organosiloxane elastomers or rubbers are obtained by vulcanizing a mixture of a fluid or a gelled organosiloxane, preferably a diorganopolysiloxane, and fillers by heating the mixture with a vulcanizing agent. The properties of the elastomers produced are dependent on various factors such as the particular type of organopolysiloxane employed, the type and amount of filler employed, the vulcanizing agent, and the general technique used in the vulcanization.

It is now well known that organosiloxane elastomers have various highly desirable properties such as thermal stability, low temperature flexibility, chemical inertness, etc. There are two particular properties, however, which have not been as good as desired by the industry. These are the properties as tested by the percent elongation obtainable before the rubber reaches its breaking point, and the so-called "compression set" of the material. The latter property is indicative of the degree to which a rubber will return to its original form after being compressed or deformed by a given weight at a given temperature for a specific period of time. A very low compression set over a wide range of temperatures is obviously highly desirable if the rubber is to be used as gasketing material.

It has been found that in general the percent elongation at break of a silicone rubber decreases with increasing filler content. Increasing the elongation at break by decreasing the filler content is not satisfactory, however, because when the filler content is decreased the resulting products are unsatisfactory in other respects, such as oil and water resistance. Decreasing the filler content also gives the highly undesirable effect of producing a high compression set rubber. It is known that the compression set of silicone elastomers can be improved by adding various mercury compounds to the vulcanizable mass. This addition does not improve the elongation at break properties, however, and is often undesirable because of the toxic properties of the mercury compounds.

It is an object of the present invention to provide heat-convertible or vulcanizable organosiloxane compositions which can be vulcanized to produce a superior silicone rubber, particularly silicone rubber with a high elongation at break (even with a high filler content) and with a low compression set.

Various methods for the production of elastomeric organopolysiloxanes, known more simply as the silicone rubbers, are well known and amply described in the art. The known methods comprise the heating of a mixture comprised essentially of an organopolysiloxane, a filler, and a vulcanizing agent. The present invention relates to an improvement in these known processes which consists of incorporating into the vulcanizable mixture, prior to the heating thereof, certain organic tin compounds. Thus this invention provides a novel heat-convertible or vulcanizable composition comprised essentially of a mixture of an organopolysiloxane having an average degree of substitution of from 1.75 to 2.25 organic groups per silicon atom, said organic groups being directly attached to silicon by carbon-silicon linkage, a filler, a vulcanizing agent, and an organic tin compound selected from the group consisting of polymeric organotin oxides, hexaorganodistannoxanes, and tin salts of carboxylic acids.

The above described compositions, after vulcanization, have the unexpected properties of a high elongation at break combined with a low compression set, even with the relatively high filler content which is usually desirable. It has been found that the presence of the defined organic tin compounds increases the elongation at break of the vulcanized elastomer by about 100 percent, while at the same time the compression set of the elastomer is decreased by about 50 percent.

The types of organopolysiloxanes which can be employed in the preparation of silicone rubber are amply described in the literature. For the purposes of this invention, any of the hitherto suggested organopolysiloxanes can be employed, as long as the average degree of substitution of the polymer ranges from 1.75 to 2.25 organic groups per silicon atom. As is known in the art, these organic groups can be alkyl, aryl, alkaryl, aralkyl or alkenyl radicals. Examples of preferred radicals are methyl, ethyl, phenyl, benzyl, tolyl, and vinyl. The organic groups can also be substituted hydrocarbon radicals as, for example, the halogenated aryl radicals such as chlorophenyl, bromophenyl, etc. Preferred species of alkyl radicals are the lower alkyls such as methyl, ethyl, and propyl. Amongst the aryl radicals, phenyl is most preferred.

It has been found that the very best elastomers can be produced from organopolysiloxanes wherein at least 50 percent of the organic groups are alkyl radicals, particularly methyl radicals, and where the degree of substitution is about 2.0. Thus the most preferred organopolysiloxanes have the average general formula $$R_nSiO_{\frac{4-n}{2}}$$

where R is alkyl or aryl, at least 50 percent of the R radicals being alkyl. The best elastomers are produced from polymers of this formula wherein $n$ has an average value of from 1.95 to 2.05. The best products are also obtained when the R radicals are either all methyl radicals or both methyl and phenyl radicals, there being, as above stated, at least 50 percent methyl radicals. Either fluid or gelled polymers can be used, but preferably the polymer is soluble in, e. g., benzene.

A wide variety of fillers are described in the art which are suitable for the preparation of silicone rubbers, and any of such fillers can be employed in the present invention. Typical examples are finely divided metal oxides such as $TiO_2$, $ZnO$, $MgO$, $Fe_2O_3$, and $Cr_2O_3$; asbestos, clay, calcium silicate, glass fiber, and many other heat-resistant inorganic materials commonly employed as fillers. The most commonly used and preferred fillers are the finely divided silicas in their various forms, such as silica aerogels, fumed silicas, and naturally occurring silicas such as diatomaceous earth. The fillers are usually employed in an amount of from 1 part by weight of filler per 10 parts of siloxane to 3 parts filler per 1 part siloxane. Maximum physical properties of the silicone rubber are ordinarily obtained by employing the filler in an amount of from 2 to 8 parts by weight per 10 parts of the organosiloxane.

Many effective silicone rubber vulcanizing agents are well known in the art, and any of these can be employed. Probably the best known of such agents are the acyl peroxides. Any acyl peroxide containing at least 1 aromatic acyl radical can be used. Of these, benzoyl peroxide is probably the best known and the most preferred agent. Examples of other preferred vulcanizing agents are t-butylperbenzoate and t-butylperacetate.

It is to be understood that other conventional constituents can be present in the vulcanizable composition of this invention. It is common, for example, to add various pigments in order to produce colored compositions. Various additives are also conventionally employed to improve the properties of the vulcanized product. For example, the metallic zirconate salts and zirconium silicates can be added to improve the stability of the elastomer, various peroxides can be used to increase the adhesion of the silicone rubber to solid surfaces, and oxides of mercury and salts of mercury can be present to improve the compression set of the product.

The organic tin compounds employed in this invention are polymeric organotin oxides, complex reaction products of a polymeric organotin oxide with a diorganodihalostannane, hexaorganodistannoxanes, or tin salts of carboxylic acids. Preferably the compounds employed are soluble in an organic solvent.

In the polymeric organotin oxides and in the dimeric hexaorganodistannoxanes, the organic groups which are attached directly to tin by carbon to tin linkage can be for example alkyl, aryl, alkaryl, aralkyl or alkenyl radicals, e. g., methyl, ethyl, propyl, isopropyl, t-butyl, phenyl, benzyl, tolyl, and vinyl radicals. The groups can be all the same or different. The polymeric tin compounds ordinarily consist of a linear chain of $R_2SnO$ units. This chain can be terminated by $R'_3Sn-$ units wherein $R'$ represents any of the above described organic radicals or alkoxy, hydroxy, or carboxy groups. The dimeric forms have the formula $R_3SnOSnR_3$.

Besides the polymeric organotin oxides, one can also employ the complexes which are formed by the reaction of a diorganotin oxide with a diorganodihalostannane such as, for example, the reaction product of diethyltin oxide with diethyldichlorostannane. These complexes are generally assumed to have a formula such as $(AO)(SnA''_2O)_m A' \cdot SnA''_2 X_2$ where A and A' are hydrogen or organic radicals of the above described type, A'' is an organic radical of the above described type, X is chlorine and bromine, and m is an integer usually of about 3 to 10 inclusive. Complexes of this type are described, for example, in U. S. Patent 2,604,460.

The tin salts of carboxylic acids which are employed are preferably the salts of the longer chain aliphatic monocarboxylic acids (saturated and unsaturated) such as those from 8 to 20 carbon atoms. Examples of the most preferred salts are tin stearate, tin palmitate, tin oleate, and tin ricinoleate.

Various other monomeric organotin compounds have also been found to be useful in this invention, e. g., the organotin alkoxides such as dibutylbutoxy tin, and the organotin carboxylates of mono- or polybasic saturated and unsaturated carboxylic acids. Tin chelate compounds such as those which can be prepared by reacting tin compounds with chelating 1-3 dialdehydes, 1-3 diketones, or 1-3 ketoaldehydes, e. g., acetonylacetone, have also been found to be useful. Also useful are the reaction products of organotin halides with compounds containing methylene groups activated by neighboring $CO-$, $NH_2-$, $CN-$, or $SO_2-$ groups. These reaction products are obtained by reacting the corresponding alkali salts of the methylene derivatives, e. g., esters of acetoacetic acid, beta-ketonamide or beta-ketonitrile.

The tin compounds described above have a favorable effect on all vulcanizable silicone elastomeric mixtures, no matter whether they are pure polysiloxanes, or mixed polymers such as polysiloxane-polysilmethylenes. It is to be understood that the organosiloxanes employed can be homopolymers, copolymers, or mixtures of various polymers. It is known that the polymeric organosiloxanes often contain, along with the $$\frac{R_n SiO_{4-n}}{2}$$

units which are their major constituents, small amounts of uncondensed OH groups; and even on occasion they contain small amounts of unhydrolyzed substituents. In defining the materials used as "organopolysiloxanes" it is to be understood that such conventional impurities are not intended to be excluded.

The defined tin compounds can be employed in this invention in a widely ranging amount. Generally, however, the best results are obtained by using the tin compounds in amounts of from about 0.1 to about 2 percent by weight based on the weight of the organosiloxane constituent. The tin compound can be merely added to the vulcanizable mass of silicone, filler, and vulcanizing agent, or it can be incorporated by impregnating the filler with the tin compound prior to incorporating the filler into the vulcanizable mass. Obviously the addition can be made by both of the above procedures if desired.

The following examples are illustrative only.

*Example 1*

To 100 g. of a dimethylsiloxane of about 3 million cs. viscosity, prepared by polymerizing a dimethylsilicone oil of 100 cs. viscosity with $PNCl_2$ according to our copending application No. 400,111 filed December 23, 1953, was added 50 g. of $SiO_2$ having an apparent density of less than 100 g. per liter, 40 g. $TiO_2$, and 3 g. benzoyl peroxide. A solution of 0.4 g. of polymeric dibutyltin oxide in 3 cc. of methylene chloride was then added to the mixture. After thorough mixing, the resultant plastic mass was molded for 10 minutes at a temperature of 125° C. and a pressure of 50 kg./cm². The resultant silicone rubber had an elongation at break of 380 percent and a compression set of 40 percent.

When a rubber was prepared in the same manner except that the addition of tin compound was omitted, there was obtained a silicone rubber with an elongation at break of 180 percent and a compression set of 65 percent (determination according to ASTM D-395-49T, Method B, using a test temperature of 150° rather than 70°).

*Example 2*

100 g. of the polymer of Example 1 was mixed with 120 g. of silica, 3 g. t-butylperbenzoate, and 0.8 g. hexabutyldistannoxane. After molding as in Example 1, a silicone rubber was obtained having a 290 percent elongation at break and a compression set of 55 percent.

By following the same procedure but without the addition of a tin compound, a silicone rubber with 120 percent elongation at break and 78 percent compression set was obtained.

*Example 3*

100 g. of the dimethylsiloxane of Example 1, 150 g. $TiO_2$, 10 g. silica, and 4 g. benzoyl peroxide were thoroughly mixed. To the mixture was added 0.6 g. of the reaction product of 3 mols of diethyltin oxide with 1 mol of diethyldichloro tin (preparation according to Harada, "Science Papers of the Institute of Physical and Chemical Research" (Tohio), volumes 35 and 36). After molding under the conditions of Example 1, a silicone rubber was obtained with 430 percent elongation at break and a compression set of 52 percent.

The same mixture without the addition of the tin compound, and molded in the same manner, gave a rubber with an elongation at break of 180 percent and a compression set of 72 percent.

*Example 4*

A mixture was prepared of 100 g. of the dimethylsiloxane of Example 1, 60 g. $SiO_2$, 2.5 g. benzoyl peroxide and 1 g. tin stearate. After vulcanizing the mass as in Example 1, a rubber was obtained having 380 percent elongation at break and a compression set of 46 percent.

Without the addition of tin stearate, the same procedure gave a silicone rubber having 175 percent elongation at break and a compression set of 68 percent.

*Example 5*

An improvement in percent elongation and compression set similar to that obtained in Example 4 is obtained by adding 1 g. tetramethyldiphenyldistannoxane to a mixture of 60 g. $SiO_2$, 2.5 g. benzoyl peroxide, and 100 g. of a copolymer containing 90 mol percent $(CH_3)_2SiO$ units and 10 mol percent $C_6H_5CH_3SiO$ units, and vulcanizing the mass.

*Example 6*

When polymeric benzylmethyltin oxide or tolylmethyltin oxide are used in the procedure of Example 4 in place of tin stearate, similarly improved silicone rubber is obtained.

That which is claimed is:

1. A heat-convertible composition comprising essentially a mixture of a non-resinous organopolysiloxane which is vulcanizable to the elastomeric state and which has an average degree of substitution of from 1.75 to 2.25 organic groups per Si atom, said organic groups being directly attached to silicon by carbon-silicon linkage, a filler, a vulcanizing agent, and an organic tin compound selected from the group consisting of polymeric organotin oxides, complex reaction products of a polymeric organotin oxide with a diorganodihalostannane, hexaorganodistannoxanes, and tin salts of carboxylic acids of from 8 to 20 carbon atoms, the organic groups in said organotin oxides, hexaorganodistannoxanes, and complex reaction products being monovalent hydrocarbon radicals.

2. The composition of claim 1 wherein the organic groups attached to tin by carbon to tin linkage are selected from the group consisting of alkyl, aryl, alkaryl, aralkyl, and alkenyl radicals.

3. A heat-convertible composition comprising essentially a mixture of a non-resinous organopolysiloxane which is vulcanizable to the elastomeric state and which has the average general formula

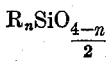

where R is selected from the group consisting of alkyl and aryl radicals, at least 50 percent of the R radicals being alkyl, and $n$ has an average value of from 1.95 to 2.05; a filler, a vulcanizing agent, and an organic tin compound selected from the group consisting of polymeric organotin oxides complex reaction products of a polymeric organotin oxide with a diorganodihalostannane, hexaorganodistannoxanes, and tin salts of carboxylic acids of from 8 to 20 carbon atoms, the organic groups in said organotin oxides, hexaorganodistannoxanes, and complex reaction products being monovalent hydrocarbon radicals.

4. The composition of claim 3 wherein the vulcanizing agent is selected from the group consisting of benzoyl peroxide and t-butylperbenzoate.

5. The composition of claim 3 wherein the organic groups attached to tin by carbon to tin linkage are selected from the group consisting of alkyl, aryl, alkaryl, aralkyl, and alkenyl radicals.

6. The composition of claim 5 wherein all of the R radicals in the organopolysiloxane are methyl.

7. The composition of claim 5 wherein the R radicals in the organopolysiloxane are both methyl and phenyl radicals, at least 50 percent of said radicals being methyl.

8. In a method for the preparation of elastomeric organopolysiloxanes comprising heating a mixture comprised essentially of a non-resinous organopolysiloxane which is vulcanizable to the elastomeric state, a filler, and a vulcanizing agent, the improvement consisting of incorporating into the mixture, prior to the heating thereof, an organic tin compound selected from the group consisting of polymeric organotin oxides, complex reaction products of a polymeric organotin oxide with a diorganodihalostannane, hexaorganodistannoxanes, and tin salts of carboxylic acids of from 8 to 20 carbon atoms, the organic groups in said organotin oxides, hexaorganodistannoxanes, and complex reaction products being monovalent hydrocarbon radicals.

9. The method of claim 8 wherein the organic tin compound is a polymeric diorganotin oxide in which the organic radicals attached directly to tin are lower alkyl radicals.

10. The method of claim 8 wherein the organic tin compound is tin stearate.

11. A vulcanizable composition consisting essentially of a mixture of a non-resinous organopolysiloxane which is vulcanizable to the elastomeric state and in which the organic groups are monovalent hydrocarbon radicals and which has an average degree of substitution of from 1.75 to 2.25 said radicals per silicon atom, said radicals being directly attached to silicon by carbon-silicon linkage, a filler, a vulcanizing agent, and an organic tin compound selected from the group consisting of polymeric organotin oxides, complex reaction products of a polymeric organotin oxide with a diorganodihalostannane, hexaorganodistannoxanes, and tin salts of carboxylic acids of from 8 to 20 carbon atoms, the organic groups directly linked to tin by carbon-tin linkage being monovalent hydrocarbon radicals.

12. A vulcanizable composition consisting essentially of a mixture of a non-resinous organopolysiloxane which is vulcanizable to the elastomeric state and which has the average general formula

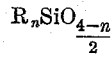

where R is a monovalent hydrocarbon radical and $n$ has an average value of from 2.0 to 2.05 inclusive, a finely divided metal oxide filler, a vulcanizing agent selected from the group consisting of benzoyl peroxide and t-butylperbenzoate, and an organic tin compound selected from the group consisting of polymeric organotin oxides, complex reaction products of a polymeric organotin oxide with a diorganodihalostannane, hexaorganodistannoxanes, and tin salts of carboxylic acids of from 8 to 20 carbon atoms, the organic groups directly linked to tin in said organotin compounds being monovalent hydrocarbon radicals.

13. In a method for the preparation of elastomeric organopolysiloxanes comprising heating a mixture consisting essentially of a non-resinous organopolysiloxane which is vulcanizable to the elastomeric state, a filler, and a vulcanizing agent, the improvement consisting of incorporating into the mixture, prior to the heating thereof, a compound having the formula $R_3SnOSnR_3$ where R is a lower alkyl radical.

References Cited in the file of this patent

UNITED STATES PATENTS

| 2,449,572 | Welsh | Sept. 21, 1948 |
| 2,504,388 | Braley | Apr. 18, 1950 |
| 2,676,948 | Rowley | Apr. 27, 1954 |
| 2,742,368 | Rossiter et al. | Apr. 17, 1956 |